United States Patent Office 3,128,288
Patented Apr. 7, 1964

3,128,288
LOWER ALKYL 2-ALKOXY-3-HYDROXY-5-METHYLTETRAHYDROFURAN-3-CARBOXYLATES
Alexander D. Argoudelis, Kalamazoo, Mich., assignor to The Upjohn Company, Kalamazoo, Mich., a corporation of Delaware
No Drawing. Filed Jan. 22, 1962, Ser. No. 167,914
4 Claims. (Cl. 260—347.5)

This invention relates to novel compositions of matter and to a process for the preparation thereof, and is particularly directed to novel lower alkyl esters of 2-alkoxy-3-hydroxy-5-methyltetrahydrofuran-3-carboxylic acid and to a process producing the same.

Actinospectacin is a biosynthetic product produced by the controlled fermentation of *Streptomyces spectabilis*. Various methods for the production, recovery, and purification of actinospectacin are described in the published literature, e.g. D. J. Mason et al., Antibiotics and Chemotherapy, 11, p. 118, 1961; M. E. Bergy et al., Antibiotics and Chemotherapy, 11, p. 661, 1961, in Union of South Africa Patent No. 60/4098 and in Belgian Patent No. 596,175. Actinospectacin is characterized by an optical rotation $[\alpha]_D^{25} = -20°$ ($H_2O$); by solubility in water, methanol, and ethanol, and by insolubility in acetone and hydrocarbon solvents; and by the presence of two basic groups: $pKa_1$ 6.95 ($H_2O$), $pKa_2$ 8.70 ($H_2O$). It was formerly thought that the molecular formula was $C_{14}H_{26}N_2O_7$ but it has since been shown that the formula is $C_{14}H_{24}N_2O_7$. On alkaline treatment of actinospectacin there is obtained actinospectinoic acid having the following structural formula:

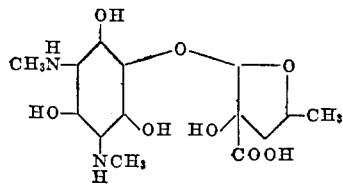

It has now been found that a novel compound according to this invention is obtained by alcoholysis of actinospectinoic acid with a mixture of hydrogen chloride and a lower alkanol. By this procedure, the actinospectinoic acid molecule is cleaved, yielding a 2,3-dihydroxy-5-methyltetrahydrofuran-3-carboxylic acid (II) as a lower alkyl ester in which the 2-hydroxyl group has been converted to a lower alkyl ether; concomitantly produced is 1,3-deoxy-1,3-bis(methylamino)-myoinositol which has been named actinamine (III).

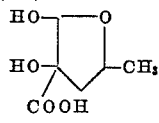

II

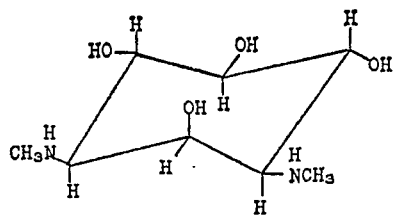

III

The novel compounds of the invention can be represented by the following formula:

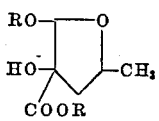

IV wherein R is a lower alkyl, e.g., methyl, ethyl, propyl, butyl, amyl, hexyl, heptyl, octyl, and the isomeric forms thereof.

When actinospectinoic acid (I) is reacted with a lower alkanol, e.g., methanol, ethanol, propanol, butanol, pentanol, hexanol, heptanol, octanol, and the like, in the presence of hydrogen chloride, which can be introduced as the gas or conveniently supplied by the use of a lower alkanoic acid chloride, e.g., acetyl, propionyl, butyryl, valeryl, caproyl, heptanoyl, caprylyl, and the like, a lower alkyl ester of 2-alkoxy-3-hydroxy-5-methyltetrahydrofuran-3-carboxylic acid is produced; concomitantly produced is an acid hydrolysis product of actinospectacin, actinamine. For example, reacting actinospectinoic acid with a mixture of acetyl chloride and methanol produces methyl 2-methoxy-3-hydroxy-5-methyltetrahydrofuran-3-carboxylate which has been given the trivial name methyl actinospectoic acid methyl ester; concomitantly produced is actinamine.

The novel compounds of the invention, lower alkyl 2-alkoxy-3-hydroxy-5-methyltetrahydrofuran-3-carboxylates have been found useful in preventing the formation of esterases and, therefore, are useful in preventing spoiling of butter and lard oils; they can also be used as plasticizers.

The novel process of the invention is useful in obtaining the novel compound actinamine which is useful in accordance with U.S. Patent 1,915,334 and 2,075,359, in preparing amine fluosilicate mothproofing agents, and, in accordance with U.S. 2,425,320, and 2,606,155, in preparing amine thiocyanate-formaldehyde condensation products for use as pickling inhibitors. Actinamine can also be reacted, either as the salt or free base, with formaldehyde and sodium sulfide to form complex aminomethyl sulfides useful as pickling inhibitors.

The following examples are illustrative of the process and products of the present invention, but are not to be construed as limiting.

EXAMPLE 1

(a) *Actinospectinoic Acid*

A solution composed of 5.0 g. of actinospectacin and 250 ml. of a 0.1 N barium hydroxide solution was allowed to stand at room temperature for 24 hrs. The pH was then adjusted to 9.0 with 2.0 N sulfuric acid; precipitated barium sulfate was removed by centrifugation. The remaining barium ion was removed by addition of more sulfuric acid and filtering the resulting barium sulfate through celite. The filtrate was evaporated to dryness under reduced pressure and then dissolved in a mixture of 15 ml. water and 250 ml. acetone. Refrigeration of this solution gave 4.52 g. of actinospectinoic acid crystals which had a melting point of 233 to 238° C. Two recrystallizations from water-acetone gave a melting point of 230 to 235° C. The crystalline actinospectinoic acid had pKa values of 3.3, 7.37, and 9.33; an optical rotation $[\alpha]_D^{25}$ —89° (c.=1.0 in $H_2O$); and characteristic infrared absorption at the following wavelengths expressed in reciprocal centimeters:

| | |
|---|---|
| 3440 (S) | 1485 (S) |
| 3340 (S) | 1160 (S) |
| 3150 (S) | 1125 (S) |
| 2700 (S) | 1080 (S) |
| 2540 (S) | 1070 (S) |
| 1715 (W) | 1055 (S) |
| 1635 (S) | 1030 (S) |
| 1595 (S) | |

ELEMENTAL ANALYSIS

Calculated for $C_{14}H_{26}N_2O_8$: C, 48.00; H, 7.43; N, 8.02; O, 36.55. Molecular weight: 350.

Found: C, 47.73; H, 7.35; N, 8.17; O, 37.23. Molecular weight: (elect. titr.) 369.

*(b) Methyl 2 - Methoxy-3-Hydroxy-5-Methyltetrahydrofuran-3-Carboxylate (Methyl Actinospectoic Acid Methyl Ester) and Actinamine*

Ten grams of actinospectinoic acid was dissolved in a mixture of 95 ml. of acetyl chloride and 600 ml. of methanol. The solution was allowed to stand at room temperature for 48 hrs. Crystalline actinamine dihydrochloride precipitated; this was separated by filtration and dried to yield 8.05 g. The filtrate was mixed with an equal volume of ether, and the mixture was allowed to stand at room temperature for 24 hrs. A small amount of actinamine dihydrochloride, which precipitated during this period, was separated by filtration and dried to yield 100 mg. The filtrate was concentrated in vacuo to a volume of 340 ml. and then adjusted to pH 6.4 by slow addition of a methanolic solution of sodium hydroxide (prepared by dissolving 12 g. of sodium hydroxide in 400 ml. of absolute methanol). Sodium chloride precipitated during the neutralization process and was separated by filtration. The filtrate (volume 1540 ml.) was concentrated to a volume of 450 ml. Additional sodium chloride precipitated during the concentration process and was also separated by filtration. The filtrate (400 ml.) was further concentrated to a volume of 150 ml. and then mixed with 500 ml. of ethyl ether and 300 ml. of acetone. The mixture was allowed to stand at room temperature for 12 hrs. Sodium chloride which precipitated was separated by filtration, and the filtrate then concentrated to dryness in vacuo to yield 6.0 grams of a viscous, slightly colored, oily material. This crude material was purified by fractional distillation to yield methyl actinospectoic acid methyl ester as a colorless viscous oil, boiling at 51 to 54° C. under pressure of 0.05 mm. of mercury and having characteristic infrared absorption at the following wavelengths expressed in reciprocal centimeters:

| | |
|---|---|
| 3450 (S) | 1150 (S) |
| 1750 (S) | 1080 (S) |
| 1740 (S) | 1035 (S) |
| 1635 (W) | 795 (S) |
| 1255 (S) | 750 (S) |

ELEMENTAL ANALYSIS

Calculated for $C_8H_{14}O_5$: C, 50.57; H, 7.43; O, 42.11; C—$CH_3$, 7.85; $OCH_3$, 32.6. Found: C, 49.49; H, 7.75; O, 43.31; C—$CH_3$, 6.8; $OCH_3$, 26.62.

Optical rotation $[\alpha]_D^{25}$ —65.5° (c., 0.998, 95% ethanol).

EXAMPLE 2

By substituting the methanol of Example 1(b) by ethanol, propanol, butanol, pentanol, hexanol, heptanol, and octanol, the corresponding 2-(ethoxy, propoxy, butoxy, pentyloxy, hexyloxy, heptyloxy, octyloxy)-3-hydroxy - 5 - methyltetrahydrofuran-3-carboxylate is obtained.

EXAMPLE 3

By substituting the acetyl chloride of Example 1(b) by gaseous hydrogen chloride, methyl actinospectoic acid methyl ester and actinamine are obtained.

I claim:

1. Lower alkyl 2-alkoxy-3-hydroxy-5-methyltetrahydrofuran-3-carboxylate of the formula:

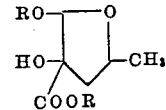

wherein R is lower alkyl.

2. 2-methoxy - 3 - hydroxy-5-methyltetrahydrofuran-3-carboxylic acid methyl ester.

3. A process which comprises (1) treatment of actinospectacin with an alkaline earth metal hydroxide to obtain actinospectinoic acid and (2) alcoholysis of actinospectinoic acid with a lower-alkanol in the presence of hydrogen chloride to obtain the lower-alkyl ester of 2-alkoxy - 3-hydroxy-5-methyltetrahydrofuran-3-carboxylic acid.

4. A process which comprises alcoholysis of actinospectinoic acid with a mixture of lower-alkanoic acid chloride and lower-alkanol to produce the corresponding lower-alkyl ester of 2-alkoxy-3-hydroxy-5-methyltetrahydrofuran-3-carboxylic acid.

References Cited in the file of this patent

Fieser: Organic Chemistry (1956), pages 130, 174–8, and 181, QD 251 F5.